United States Patent [19]
Cifuentes et al.

[11] Patent Number: 5,508,360
[45] Date of Patent: Apr. 16, 1996

[54] MOISTURE-CURABLE HOT MELT SILICONE PRESSURE-SENSITIVE ADHESIVES

[75] Inventors: Martin E. Cifuentes; Michael R. Strong; Bernard VanWert; Michael A. Lutz; Randall G. Schmidt, all of Midland, Mich.

[73] Assignee: Dow Corning Corporation, Midland, Mich.

[21] Appl. No.: 414,465

[22] Filed: Mar. 31, 1995

[51] Int. Cl.$^6$ .................................................. C08F 283/12
[52] U.S. Cl. .............................. 525/477; 528/38; 528/34; 528/39
[58] Field of Search .............................. 525/477; 528/38, 528/34

[56] References Cited

U.S. PATENT DOCUMENTS

| | | | |
|---|---|---|---|
| 4,143,088 | 3/1979 | Favre et al. | 260/825 |
| 5,013,577 | 5/1991 | Wright et al. | 427/35 |
| 5,091,484 | 2/1992 | Colas et al. | 525/477 |
| 5,302,671 | 4/1994 | Cifuentes et al. | 525/477 |

FOREIGN PATENT DOCUMENTS

| | | | |
|---|---|---|---|
| 0529841 | 8/1992 | European Pat. Off. | C09J 183/14 |
| 481487 | 3/1992 | Japan | C09J 183/04 |

*Primary Examiner*—Melvyn I. Marquis
*Assistant Examiner*—Margaret Glass
*Attorney, Agent, or Firm*—Sharon K. Severance

[57] ABSTRACT

The present invention relates to a silicone pressure-sensitive adhesive composition which cure upon exposure to ambient moisture. The moisture-curable silicone pressure-sensitive adhesive composition of the instant invention comprise:

(A) an organopolysiloxane resin containing curing radicals of the formula —SiY$_2$ZNY'ZSiR$^1{}_x$Y"$_{3-x}$ wherein R$^1$ is a monovalent hydrocarbon radical, each Z is a divalent linking group, each Y is independently selected from the group consisting of a monovalent organic radical, an enoloxy radical, an alkoxy radical, and an oximo radical; Y' is selected from the group consisting of a monovalent organic radical, a hydrogen atom, and —ZSiR$^1{}_x$Y"$_{3-x}$; Y" is selected from the group consisting of an enoloxy radical, an alkoxy radical, and an oximo radical; and the subscript x has a value of 0 or 1; (B) a diorganopolysiloxane polymer, each terminal group thereof containing at least one silicon-bonded hydrolyzable functional radicals selected from the group consisting of hydroxyl radicals, alkoxy radicals having 1 to 4 carbon atoms, ketoxime radicals, enoloxy radicals, aminoxy radicals, acetamido radicals, N-methylacetamido radicals and acetoxy radicals; said polymer having a viscosity at 25° C. of 20 to <100,000 mm$^2$/s and the weight ratio of said resin to said polymer being in the range 5:95 to 90:10; (C) optionally, sufficient catalyst to accelerate the cure of said composition; (D) optionally a silane of the formula R$^2{}_{4-y}$SiX$_y$, or oligomeric reaction product thereof, in which R$^2$ is selected from the group consisting of hydrocarbon radicals and substituted hydrocarbon radical having 1 to 6 carbon atoms, X is a hydrolyzable group and y is 2 to 4; and (E) optionally, a filler.

39 Claims, No Drawings

MOISTURE-CURABLE HOT MELT SILICONE PRESSURE-SENSITIVE ADHESIVES

BACKGROUND OF THE INVENTION

The present invention relates to a silicone pressure-sensitive adhesive composition. More particularly, the invention relates to pressure sensitive adhesive compositions which cure upon exposure to ambient moisture.

Silicone pressure-sensitive adhesives (hereinafter also referred to as PSAs) typically contain at least two primary components, namely a linear siloxane polymer and a tackifier resin consisting essentially of triorganosiloxane (M) units (i.e., $R_3SiO_{1/2}$ units, in which R denotes a monovalent organic group) and silicate (Q) units (i.e., $SiO_{4/2}$ units). In addition to the above two ingredients, silicone PSA compositions are generally provided with some crosslinking means (e.g., peroxide or hydrosilation cure systems) in order to optimize various properties of the final adhesive product. In view of the high viscosity imparted by the polymer component, these PSA compositions are typically dispersed in an organic solvent for ease of application.

A copending application Ser. No. 08/063,105 which is a continuation of U.S. patent application Ser. No. 07/748,478, filed on May 14, 1993 (EP Publication 529841 A1) to Krahnke et al., and now corresponds to U.S. Pat. No. 5,470,923, describes silicone PSAs that cure in the presence of moisture to permanent adhesives. The compositions are particularly useful as structural adhesives for adhering glass panels to structural materials such as concrete, aluminum and steel. The two required ingredients of the PSA are an MQ resin and a high consistency polydiorganosiloxane gum. One or both ingredients of the PSA compositions described in this copending application contain moisture activated alkoxy curing groups. Due to the high viscosity of gum type polydiorganosiloxanes even at elevated temperatures, the compositions are not suitable for application as heated molten materials and are typically applied in solution form wherein the solvent is removed prior to curing of the composition or evaporates during the curing reaction.

Another moisture-curable PSA system is disclosed in Japanese laid open patent application (Kokai) No. 4(1992)/81,487. These PSAs comprise (1) 100 parts by weight of an MQ resin having a hydroxyl content of up to 0.7 weight percent, (2) a liquid polydiorganosiloxane containing hydrolyzable terminal groups and (3) a condensation catalyst to promote curing of the composition in the presence of moisture. The molar ratio of silanol groups in the resinous copolymer to hydrolyzable terminal groups in the liquid polydiorganosiloxane is from 1 to 10. A characterizing feature of these compositions is their ability to retain the characteristics of pressure sensitive adhesives under both dry and wet conditions following reaction of the moisture reactive groups.

U.S. Pat. No. 5,091,484 to Colas et al. describes elastomer-forming compositions containing (1) a hydroxyl- or alkoxy-terminated polydiorganosiloxane, (2) an alkoxy-functional MQ resin that is preferably liquid under ambient conditions and (3) a titanium-containing curing catalyst. These compositions are described as flowable under ambient conditions and cure in the presence of atmospheric moisture to yield elastomeric materials. The resins of Colas are produced by reacting a —SiH site on the resin with a alkenyl containing alkoxy silane in the presence of platinum.

Moisture-curable compositions which cure to elastomers are also disclosed by Favre et al. in U.S. Pat. No. 4,143,088.

These compositions are prepared by mixing (a) a hydroxyl-terminated polydiorganosiloxane, (b) an MQ resin, (c) an alkoxylated organosilicon compound and (d) an organic titanium derivative. Before being cured, these systems are liquids under ordinary conditions.

Copending U.S. patent application Ser. No. 08/076,615 to Cifuentes et al., commonly owned, discloses a hot melt composition comprising (i) a solid hydroxyl-functional MQ resin, (b) a diorganopolysiloxane polymer containing at least two terminal alkoxy radicals, (iii) a hydrolyzable silane and (iv) a cure catalyst. These compositions have a high initial adhesive strength and cure in the presence of moisture to non-tacky elastomers.

It has now been found that the strength properties and adhesive strength at elevated temperatures can be improved by employing a functional MQ resin in the PSA composition.

It is an object of the instant invention to show a moisture-curable pressure sensitive adhesive composition which has improved strength properties, and adhesive strength at elevated temperature.

SUMMARY OF THE INVENTION

The present invention therefore relates to a moisture-curable silicone pressure-sensitive adhesive composition comprising:

(A) an organopolysiloxane resin containing curing radicals of the formula —$SiY_2ZNY'ZSiR^1_xY''_{3-x}$ wherein $R^1$ is a monovalent hydrocarbon radical, each Z is a divalent linking group, each Y is independently selected from the group consisting of a monovalent organic radical, an enoloxy radical, an alkoxy radical, an alkoxyalkyl radical and an oximo radical; Y' is selected from the group consisting of a monovalent organic radical, a hydrogen atom, and —$ZSiR^1_xY''_{3-x}$; Y'' is selected from the group consisting of an enoloxy radical, an alkoxy radical, and an oximo radical; and the subscript x has a value of 0 or 1;

(B) a diorganopolysiloxane polymer, each terminal group thereof containing at least one silicon-bonded hydrolyzable functional radicals selected from the group consisting of hydroxyl radicals, alkoxy radicals having 1 to 4 carbon atoms, ketoxime radicals, enoloxy radicals, aminoxy radicals, acetamido radicals, N-methylacetamido radicals and acetoxy radicals; said polymer having a viscosity at 25° C. of 20 to <100,000 $mm^2$/s and the weight ratio of said resin to said polymer being in the range 5:95 to 90:10;

(C) optionally, sufficient catalyst to accelerate the cure of said composition;

(D) optionally a silane of the formula $R^2_{4-y}SiX_y$ or oligomeric reaction product thereof, in which $R^2$ is selected from the group consisting of hydrocarbon radicals and substituted hydrocarbon radical having 1 to 6 carbon atoms, X is a hydrolyzable group and y is 2 to 4; and (E) optionally, a filler.

DETAILED DESCRIPTION OF THE INVENTION

Component (A) of the present invention is an organopolysiloxane resin containing curing radicals of the formula —$SiY_2ZNY'ZSiR^1_xY''_{3-x}$ wherein $R^1$ is a monovalent hydrocarbon radical, each Z is a divalent linking group, each Y is independently selected from the group consisting of a monovalent organic radical, an enoloxy radical, an alkoxy radical, and an oximo radical; Y' is selected from the group consisting of a monovalent organic radical, a hydrogen atom, and $—ZSiR^1{}_xY''{}_{3-x}$; Y" is selected from the group consisting of an enoloxy radical, an alkoxy radical and an oximo radical; and the subscript x has a value of 0 or 1.

Component (A) includes a resinous portion wherein the $R_3SiO_{1/2}$ siloxane units (M units) are bonded to the $SiO_{4/2}$ siloxane units (Q units), each of which is bonded to at least one other $SiO_{4/2}$ siloxane unit; wherein R is selected from the group consisting of hydrocarbon radicals and halogenated hydrocarbon radicals. Some $SiO_{4/2}$ siloxane units may be bonded to hydroxyl radicals resulting in $HOSiO_{3/2}$ units (i.e., TOH units), thereby accounting for any silicon-bonded hydroxyl content of the organopolysiloxane resin. Additionally, the resinous portion of component (A) contains curing radicals in the formula $—SiY_2ZNY'ZSiR^1{}_xY''{}_{3-x}$ typically in the form of $Y''{}_{3-x}R^1SiZNY'ZSiY_2OSiO_{3/2}$ units. In addition to the resinous portion, component (A) can contain a small amount of a low molecular weight material comprised substantially of a neopentamer organopolysiloxane having the formula $(R_3SiO)_4Si$, the latter material being a byproduct in the preparation of the resin.

For the purposes of the present invention, the ratio of $R_3SiO_{1/2}$ siloxane units to $SiO_{4/2}$ siloxane units has a molar ratio of 0.5 to 1.2, respectively. It is preferred that the mole ratio of the total M siloxane units to total Q siloxane units of (A) be between 0.6 and 1.0. The above M/Q mole ratios can be easily obtained by $^{29}Si$ nuclear magnetic resonance, this technique being capable of a quantitative determination of the molar contents of: M (resin), M(neopentamer), Q (resin), Q(neopentamer) and TOH. For the purposes of the present invention, as implicitly stated supra, the M/Q ratio {M(resin)+M(neopentamer)}/{Q(resin)+Q(neopentamer)} represents the ratio of the total number of triorganosiloxy groups of the resinous and neopentamer portions of (A) to the total number of silicate groups of the resinous and neopentamer portions of (A). It will, of course, be understood that the above definition of the M/Q mole ratio accounts for the neopentomer resulting from the preparation of resin (A) and not for any intentional addition of neopentomer.

In the formula for Component (A), R denotes a monovalent radical selected from the group consisting of hydrocarbon and halogenated hydrocarbon radicals, preferably having less than 20 carbon atoms, and most preferably having from 1 to 10 carbon atoms. Examples of suitable R radicals include alkyl radicals, such as methyl, ethyl, propyl, pentyl, octyl, undecyl and octadecyl; cycloaliphatic radicals, such as cyclohexyl; aryl radicals such as phenyl, tolyl, xylyl, benzyl, alpha-methyl styryl and 2-phenylethyl; alkenyl radicals such as vinyl; and chlorinated hydrocarbon radicals such as 3-chloropropyl and dichlorophenyl.

Preferably, at least one-third, and more preferably substantially all R radical in the formula for component (A), are methyl radicals. Examples of preferred $R_3SiO_{1/2}$ siloxane units include $Me_3SiO_{1/2}$, $ViMe_2SiO_{1/2}$, $PhMe_2SiO_{1/2}$ and $Ph_2MeSiO_{1/2}$ where Me hereinafter denotes methyl and Ph hereinafter denotes phenyl.

$R^1$ is a monovalent hydrocarbon radical having from 1 to 10, preferably 1 to 6 carbon atoms. $R^1$ may be exemplified by, but not limited to, alkyl radicals such as methyl, ethyl, propyl, and isopropyl; alkenyl radicals such as vinyl; and aryl radicals such as phenyl. $R^1$ is preferably methyl.

Y is independently selected from the group consisting of a monovalent organic radical, an enoloxy radical, an alkoxy radical, an alkoxyalkyl and an oximo radical. Y may be alkyl radicals such as methyl, ethyl, propyl, butyl, and hexyl; cycloaliphatic radicals such as cyclohexyl; aryl radicals such as phenyl, benzyl, styryl, tolyl, and xenyl; alkoxy radicals such as methoxy and ethoxy radicals; ketoxime radicals of the general formula $—ON=C(R^3)_2$, in which each $R^3$ independently represents an alkyl radical having 1 to 6 carbon atoms or a phenyl radical; and enoloxy radicals, such as isopropenyloxy, of the general formula $—OC(R^4)=CR^5{}_2$ in which $R^4$ represents an monovalent hydrocarbon radical having 1 to 4 carbon atoms and each $R^5$ is independently selected from the group consisting of $R^4$ and a hydrogen atom. Preferably Y is a methyl radical or an alkoxy radical.

Y' is selected from the group consisting of a monovalent organic radical a hydrogen atom and the group $—ZSiR^1{}_xY''{}_{3-x}$. Y' may be alkyl radicals such as methyl, ethyl, propyl, butyl, and hexyl; cycloaliphatic radicals such as cyclohexyl; aryl radicals such as phenyl, benzyl, styryl, tolyl, and xenyl; and alkenyl radicals such as vinyl and allyl and halogenated derivatives thereof, alkoxy radicals such as methoxy and ethoxy radicals; aryloxy radicals and hydrogen atoms. Preferably Y' is selected from the group consisting of methyl and hydrogen.

Y" is selected from the group consisting of an enoloxy radical, an alkoxy radical, and an oximo radical. Y" may be alkoxy radicals such as methoxy and ethoxy radicals; ketoxime radicals of the general formula $—ON=C(R^3)_2$, in which each $R^3$ independently represents an alkyl radical having 1 to 6 carbon atoms or a phenyl radical; and enoloxy radicals, such as isopropenyloxy of the general formula $—OC(R^4)=CR^5{}_2$ in which $R^4$ represents an monovalent hydrocarbon radical having 1 to 4 carbon atoms and each $R^5$ is independently selected from the group consisting of $R^4$ and a hydrogen atom. Preferably Y" is a an alkoxy radical.

Z is a divalent linking group which links the silicone and nitrogen atoms. Z may be exemplified by, but not limited to amine functional radicals such as $—CH_2CH_2CH_2NHCH_2CH_2—$, $—CH_2CH(CH_3)CH_2NHCH_2CH_2—$ $—CH_2CH_2CH_2N(Z'SiR^1{}_x(OCH_3)_{3-x})CH_2CH_2—$, $—CH_2CH(CH_3)CH_2N(Z'SiR^1{}_x(OCH_3)_{3-x})CH_2CH_2—$,; alkylene radicals such as $—CH_2CH_2—$, $—CH_2CH_2CH_2—$, $—CH_2CH(CH_3)CH_2—$, and $—(CH_2)_6—$; oxy radicals such as $—OCH(CH_3)CH_2—$; radicals such as $—CH_2CH(OH)CH_2OCH_2CH_2CH_2—$ which are produced from the reaction between the epoxy group and the amine group; and arylene radicals such as $—C_6H_4—$, $—CH_2C_6H_4—$, and $—CH_2C_6H_4CH_2—$. Z may be the same or different radicals. Preferably one Z is a $—CH_2CH(CH_3)CH_2—$ or a $—CH_2CH_2CH_2—$ radical and the other Z is a $—CH_2CH(OH)CH_2OCH_2CH_2CH_2—$ radical.

It is preferred that the resinous portion of component (A) have a number average molecular weight (Mn) of about 1,500 to 15,000 when measured by gel permeation chromatography (GPC), the neopentamer peak being excluded from the measurement. In this molecular weight determination, narrow fractions of MQ resins are used to calibrate the GPC equipment, the absolute molecular weights of the fractions being first ascertained by a technique such as vapor phase osmometry. This molecular weight is preferably above about 3,000, most preferably 3,500 to 6,500.

One preferred embodiment of the instant invention is a composition that is a hot-melt silicone pressure sensitive adhesive. In order for the composition to be a hot-melt PSA the organopolysiloxane resin (A) should be a solid at room temperature. To be a solid it must have a softening point above ambient, preferably above 40° C. When this condition is not realized, the hot melt PSAs obtained do not exhibit the required non-slump character. By "non-slump" it is meant that the material appears to be a solid such that, when a 60 cc jar is filled to about one third capacity with the material and tipped on its side at room temperature (i.e., about 25° C.), essentially no flow is observed within a 20 minute period. This corresponds to a minimum room temperature dynamic viscosity in the approximate range $2 \times 10^7$ to $8 \times 10^7$ mPa.s when measured at 1 radian/sec. The hot melt compositions of the instant invention flow at elevated temperatures and can readily be extruded from a conventional hot melt gun (e.g., the dynamic viscosity is preferably of the order $10^4$ mPa.s at 200° C.).

The organopolysiloxane resin (A) of the instant invention is produced by one of several methods wherein the first method comprises reacting (i) an amine functional resin comprising $R_3SiO_{1/2}$ siloxane units, $SiO_{4/2}$ siloxane units and $O_{3/2}SiOSiY_2ZNHY'''$ siloxane units wherein the mole ratio of the $R_3SiO_{1/2}$ siloxane units to $SiO_{4/2}$ has a value of from 0.5/1 to 1.2/1; with (ii) an epoxy compound having the formula $Z'SiR^1_xY''_{3-x}$; wherein R, $R^1$, Y, Y", Z and the subscript x are as previously defined herein and Y''' is selected from the group consisting of a monovalent organic group and a hydrogen atom; and Z' is an organic group composed of carbon, hydrogen and oxygen having therein at least one oxirane group of the formula

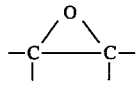

Y''' may be exemplified by alkyl radicals such as methyl, ethyl, propyl, butyl, and hexyl; cycloaliphatic radicals such as cyclohexyl; aryl radicals such as phenyl, benzyl, styryl, tolyl, and xenyl and a hydrogen atom.

Z' may be further exemplified by, but not limited to such groups represented by the general formula

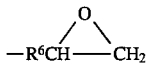

wherein $R^6$ is selected from a divalent group such as $-CH_2CH_2-$, $-(CH_2)_3-$, $-CH_2CH(CH_3)CH_2-$, phenylene, and cyclohexylene or an ether oxygen-containing group such as $-CH_2CH_2OCH_2CH_2-$, and $-CH_2CH_2OCH(CH_3)CH_2-$. γ-Glycidoxypropyltrimethoxysilane is the preferred epoxy compound.

A second method for producing the organopolysiloxane resin (A) of the instant invention comprises reacting (iii) an epoxy functional resin comprising $R_3SiO_{1/2}$ siloxane units, $SiO_{4/2}$ siloxane units and $O_{3/2}SiOSiY''_{2-x}R^1_xZ'$ siloxane units wherein the mole ratio of the $R_3SiO_{1/2}$ siloxane units to $SiO_{4/2}$ has a value of from 0.5/1 to 1.2/1; with (iv) an aminosilane or cyclic silazane; wherein R, $R^1$, Y", and Z' are as defined herein previously.

A third method for producing the organopolysiloxane resin (A) of the instant invention comprises reacting (v) a hydroxyl functional siloxane resin with (vi) the reaction product of an aminosilane and an epoxy compound (ie. a compound having the general formula $Y''_{3-x}SiY_2ZNY'ZSiR^1_xY''_{3-x}$.

The preferred method of producing the organopolysiloxane resin (A) is to react an amine functional resin (i) with an epoxy compound (ii). The amine functional resin (i) can be prepared by methods known in the art. One method comprises reacting the silanol groups of a siloxane resin comprised of $R_3SiO_{1/2}$ units, $SiO_2$ units and $HOSiO_{3/2}$ units with an aminosilane having a radical of the formula $-ZNHY'''$. Another method comprises reacting a hydroxyl functional organopolysiloxane resin with a cyclic silazane. U.S. Pat. No. 5,013,577 to Wright et al. is incorporated herein by reference to teach how to prepare amine functional resins which meet the requirements of the present invention.

The method of Wright et al. comprises reacting the silanol groups of a siloxane resin comprised of $R_3SiO_{1/2}$ units, $SiO_2$ units and $HOSiO_{3/2}$ units with a cyclic silazane of the formula

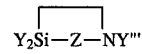

wherein R, Y, Y''', and Z are as defined above or with an aminosilane. This reaction may be carried out in the presence of a catalyst such as tirfluoroacetic acid. A solvent is not required but a nonreactive solvent may be used to dilute the reactants and products. Typically the hydroxyl-functional organopolysiloxane resin is supplied in such a solvent.

Aminosilanes useful in the production of the amine functional resin (i) include, but are not limited to, aminopropyltrimethoxysilane, aminoethylaminopropyltrimethoxysilane, aminoethylaminopropylmethyldimethoxysilane, aminoethylaminoisobutyltrimethoxysilane and aminoethylaminoisobutylmethyldimethoxysilane.

The amount of hydroxyl-functional organopolysiloxane resin and aminosilane and/or cyclic silazane reacted to produce the amine functional resin (i) is not specifically limited but should be sufficient to replace some or all of the hydroxyl groups on the resin with amine radicals of the formula $-OSiY_2ZNHY'''$. It is preferred to convert only some of the hydroxyl groups on the resin to amine functionality while the remaining hydroxyl groups on the resin are left unreacted, capped with a non-alkoxy functional group or treated with a hydrolyzable silane or fluid.

The amine functional resin (i) may be further reacted (capped) to reduce the hydroxyl content prior to or following the reaction with the epoxy compound (ii). The instant invention may also be carried out by starting with a capped organopolysiloxane resin and producing the amine functional resin (i) therefrom. Methods for producing capped organopolysiloxane resins are well known in the art. A capped organopolysiloxane resin may be prepared by first preparing an untreated resin copolymer and thereafter treating an organic solvent solution of the untreated resin copolymer with a suitable endblocking agent to reduce the amount of silicon-bonded hydroxyl units to less than about 1 weight percent, preferably less than 0.7 wt %. Endblocking agents capable of providing endblocking triorganosilyl units are commonly employed as silylating agents and a wide variety of agents are known and disclosed in U.S. Pat. Nos. 4,584,355 and 4,591,622 to Blizzard, et al., and U.S. Pat. No. 4,585,836 to Homan, et al. which are hereby incorporated by reference. A single endblocking agent such as hexamethyldisilazane can be used or a mixture of such agents can be used. The procedure for treating the resin copolymer may be simply to mix the endblocking agent with a solvent solution of the resin copolymer and allowing the by-products to be removed. Preferably, an acid catalyst is added and the mixture is heated to reflux conditions for a few hours.

The amine functional resin (i) is then reacted with an epoxy compound (ii) having the formula $Z'SiR^1_xY''_{3-x}$; wherein $R^1$, Z', Y" and subscript x are as described previously herein.

The amount of amine functional organopolysiloxane resin (i) and epoxy compound (ii) reacted to produce the organopolysiloxane resin (A) of the instant invention is not specifically limited. The amount of epoxy compound (ii) used will depend on the application for the final pressure sensitive adhesive applications to have free amine present on the resin to help with the curing of the adhesive. However, it is preferred to use at least an equimolar amount of epoxy compound (moles epoxy) to amine functional organopolysiloxane resin (moles amine).

The reaction to produce the organopolysiloxane resin (A) is typically carried out in the presence of a solvent. Suitable solvents include hydrocarbon liquids such as benzene, toluene, xylene, heptane and the like and silicone liquids such as cyclic or linear polydiorganosiloxanes. It is preferable to use xylene.

It has been found that under certain conditions a minimum amount of solvent is preferred to get the highest efficiency in the reaction to produce the amine-functional resin (i). It is preferred that there be at least 40 weight percent solvent, more preferably 50 weight percent solvent present during the reaction. When there is less than 40 wt % solvent then the aminosilane or cyclic silazane may not fully react with the resin. The amount of solvent present during the reaction appears to be more important for higher molecular weight, soluble resins and/or when the resin contains higher levels of hydroxyl functionality.

Component (B) of the present invention is a diorganopolysiloxane polymer, each terminal group thereof containing at least one, preferably two, silicon-bonded hydrolyzable functional radicals selected from the group consisting of alkoxy radicals having 1 to 4 carbon atoms, ketoxime radicals, enoloxy radicals, aminoxy radicals, acetamido radicals, N-methylacetamido radicals and acetoxy radicals. The repeat units of diorganopolysiloxane (B) are $R_2SiO_{2/2}$ siloxy units wherein R is independently selected from the same hydrocarbon and halogenated hydrocarbon radicals delineated above for component (A).

Component (B) can comprise a single diorganopolysiloxane or a mixture of two or more different diorganopolysiloxanes. Component (B) should have a viscosity at 25° C. of about 20 to 100,000 mm$^2$/s, preferably 350 to 60,000 mm$^2$/s. It is preferred that at least 50%, and preferably at least 85%, of the organic radicals along the chain of component (B) are methyl radicals, which radicals can be distributed in any manner in the diorganopolysiloxane. Further, component (B) can comprise siloxane branching sites provided it meets the above viscosity requirements. The side chains emanating from such branch points, of course, have terminal units which can also contain the above described hydrolyzable radicals.

The terminal units of diorganopolysiloxane (B) are selected from the group consisting of R, hydroxyl radicals, alkoxy radicals having 1 to 4 carbon atoms, ketoxime radicals, enoloxy radicals, acetamido, N-methylacetamido and acetoxy radicals. It is preferred that the terminal units contain at least one terminal group selected from the group consisting of alkoxy radicals having 1 to 4 carbon atoms, ketoxime radicals, enoloxy radicals, acetamido radicals, N-methylacetamido radicals and acetoxy radicals. When the hydrolyzable group is an alkoxy radical it is preferred that the diorganopolysiloxane contain at least two terminal hydrolyzable functional radicals.

The alkoxy radicals may be exemplified by the formula —$ZSiR^1_x(OR^7)_{3-x}$ wherein $R^1$, Z and subscript x are as defined above and $R^7$ is selected from the group consisting of alkyl radicals and alkoxyalkyl radicals. $R^7$ may be exemplified by, but not limited to methyl, ethyl, isopropyl, methoxyethyl, and ethoxyethyl. $R^7$ is preferably methyl.

The preparation of diorganopolysiloxane polymers having such alkoxy terminal groups is described in detail in above cited U.S. Pat. No. 5,470,923 hereby incorporated by reference to teach these preparative methods. Alkoxy functional groups having the representative formulae $(MeO)_3SiO—$ and $Me(MeO)_2SiO—$ can be introduced into a silanol-terminated diorganopolysiloxane by compounds having the formulae $(MeO)_4Si$ and $Me(MeO)_3Si$, respectively, as is well known in the art.

The ketoxime radicals may be exemplified by general formula —$ON=C(R^3)_2$, in which each $R^3$ independently represents an alkyl radical having 1 to 6 carbon atoms or a phenyl radical. Methods for producing diorganopolysiloxanes having ketoxime radicals are known in the art. The ketoxime radicals may be further exemplified by, but not limited to, dimethylketoxime, methylethylketoxime, and cyclohexanoxime.

The enoloxy radicals may be exemplified by the general formula —$OC(R^4)=CR^5_2$ in which $R^4$ represents an monovalent hydrocarbon radical having 1 to 4 carbon atoms and each $R^5$ is independently selected from the group consisting of $R^4$ and a hydrogen atom. Preferably the enoloxy radical is an isopropenyloxy radical.

Other hydrolyzable functional radicals may be exemplified by, but not limited to aminoxy radicals, acetamido radicals, N-methylacetamido radicals and acetoxy radicals.

The preferred diorganopolysiloxanes (B) of the invention are polydimethylsiloxanes which are terminated with groups having the structures $(MeO)_3SiCH_2CH_2Si(Me_2)OSi(Me_2)CH_2CH_2—$, $(MeO)_3SiO—$ or $Me(MeO)_2SiO—$, $(MeO)_3SiCH_2CH_2SiMe_2O—$.

Another method for preparing hydrolyzable-functional diorganopolysiloxane (B) is to react a hydroxyl-functional diorganopolysiloxane with a hydrolyzable-functional silane. This reaction is typically conducted in the presence of a suitable catalyst such as an alkyl titanate. Heating of the mixture may be required for the reaction to proceed at a useful rate. Alternatively, a hydroxyl-functional diorganopolysiloxane can be capped in-situ by reacting it with an hydrolyzable-functional silane in the presence of a solution of resin (A) and, preferably, also in the presence of a process catalyst. Suitable process catalysts include, but are not limited to, stannous octoate, a base or tetrabutyltitanate. It may be necessary, although not always required to neutralize the process catalyst upon completion of the reaction. When the process catalyst is a $Sn^{II}$ salt, the catalyst is de-activated thermally, or by an appropriate agent before further processing. Likewise, when the process catalyst is a base, such as potassium carbonate, this base is neutralized before further processing.

The pressure sensitive compositions of the present invention can be obtained when the weight ratio of resin (A) to diorganopolysiloxane polymer (B) is from 5:95 to 90:10, preferably 40:60 to 70:30, and most preferably 55:45 to 65:35. The precise ratio needed to form these systems can be ascertained for a given resin and polymer combination by routine experimentation based on the instant disclosure.

Optional catalyst (C), which is used to accelerate the cure of the instant compositions upon exposure to moisture, may be selected from those compounds known in the art to promote the hydrolysis and subsequent condensation of hydrolyzable groups on silicon. Suitable curing catalysts include, but are not limited to, tin IV salts of carboxylic acids, such as dibutyltin dilaurate, and organotitanium compounds such as tetrabutyl titanate and partially chelated derivatives of these salts with chelating agents such as acetoacetic acid esters and beta-diketones.

A sufficient quantity of catalyst (C) is added to accelerate the cure of the PSA composition. This amount can readily be determined by the skilled artisan through routine experimentation and is typically about 0.01 to 3 percent based on the combined weight of the resin and polymer solids.

Optional silane (D) of the present invention is represented by monomers the formula $R^2_{4-y}SiX_y$ and oligomeric reaction products thereof, in which $R^2$ is selected from the group consisting of hydrocarbon radicals and substituted hydrocarbon radicals having 1 to 6 carbon atoms. X in the above formula is a hydrolyzable group, preferably selected from alkoxy radicals having 1 to 4 carbon atoms, ketoxime radicals, enoloxy radicals, aminoxy radicals, acetamido radicals, N-methylacetamido radicals or acetoxy radicals and y is 2 to 4, preferably 3 to 4.

Specific examples of preferred silanes include methyltrimethoxysilane, methyltriethoxysilane, propyltrimethoxysilane, tetramethoxysilane, tetraethoxysilane, phenyltrimethoxysilane, isobutyltrimethoxysilane, glycidoxypropyltrimethoxysilane, ethyltrimethoxysilane, aminopropyltrimethoxysilane, aminoethylaminopropyltrimethoxysilane, methyltriacetoxysilane, ethyltriacetoxysilane, tetra(methylethylketoximo)silane, methyltris(methylethylketoximo)silane and vinyltris(methylethylketoximo)silane, methylvinyl bis(n-methylacetamido)silane and others.

Typically the silane (D) is added in amounts ranging from 0.01 to 10 weight percent, preferably from 0.3 to 5 weight percent based on the weight of (A) and (B). The silane may be added for several purposes including, but not limited to, to provide stability to the compositions, to cap any unreacted hydroxyls on the organopolysiloxane resin (A) and/or diorganopolysiloxane polymer (B), to consume any water that may have been generated in producing the PSA and/or as an adhesion promoter. When a hydroxyl-functional polydiorganosiloxane is capped with a hydrolyzable functional silane in an in-situ process to produce (B), described previously, it will be understood that the amount of silane (D) to be added is in excess beyond that amount of hydrolyzable silane needed to cap all of the hydroxyl functionality.

The PSAs of the instant invention may be produced by mixing an hydrolyzable-functional polydiorganosiloxane (B) of the invention with an organic solvent solution of resin (A). The solvent employed is preferably the one used to prepare the resin component, for example, a hydrocarbon liquid such as benzene, toluene, xylene, heptane or others or a silicone liquid such as cyclic or linear polydiorganosiloxanes. If a silane (D) is to be used it is preferred to first blend with the solution of resin (A) and then add to that mixture diorganopolysiloxane (B). Although not necessary, the mixture of (A) and (B) may be heated to a temperature of 20° to 110° C. for a period of about 1 to 24 hours. The PSA composition may be applied from the solvent or the solvent may then be stripped off to provide an essentially solvent-free composition. The stripping of the solvent (devolatilization) can be effectively accomplished by heating the mixture under vacuum, for example at 90° C. to 150° C. and <10 millimeters of mercury in a batch operation. The removal of solvent can also be accomplished by any of the known techniques, such as contact with a stream of inert gas, evaporation, distillation, thin film stripping, and the like. Excessively high temperatures should be avoided when all the components are being devolatilized. A temperature of 200° C., and preferably 150° C., should not be exceeded. Catalyst (C) may be added at this point, if desired, or catalyst (C) may be added to the mixture of resin (A) and polydiorganosiloxane (B).

It is, of course, understood that the above procedures are to be carried out in the absence of moisture in order to prevent premature curing of the compositions. This also applies to subsequent storage of the compositions.

In general, small amounts of additional ingredients may be added to the compositions of this invention. For example, antioxidants, pigments, stabilizers, fillers, and others, may be added as long as they do not materially alter the requirements stipulated herein.

In addition to the above mentioned components a filler may be optionally added to the compositions of this invention. The filler may be added in an amount up to 50 wt %, preferably up to 25 wt %. Fillers useful in the instant invention may be exemplified by, but not limited to, inorganic materials such as pyrogenic silica, precipitated silica and diatomaceous silica, ground quartz, aluminum silicates, mixed aluminum and magnesium silicates, zirconium silicate, mica powder, calcium carbonate, glass powder and fibers, titanium oxides of the pyrogenic oxide and rutile type, barium zirconate, barium sulphate, barium metaborate, boron nitride, lithopone, the oxides of iron, zinc, chrome, zirconium, and magnesium, the different forms of alumina (hydrated or anhydrous), graphite, lamp black, asbestos, and calcined clay and organic materials such as the phthalocyaniines, cork powder, sawdust, synthetic fibers and synthetic polymers (polytetrafluoroethylene, polyethylene, polypropylene, polystyrene and polyvinyl chloride). The filler may be of a single type or mixtures of several types. The PSA compositions of the instant invention can be applied to various substrates by techniques well known in the art. For example, when the viscosity is sufficiently low or is adjusted with solvents, these systems may be coated onto substrates and used as an adhesive or coating composition.

When the compositions are hot melt PSAs, these formulations may be applied to various substrates by techniques currently employed for dispensing organic hot melt formulations (e.g., hot melt gun, spraying, extrusion, spreading via heated draw-down bars, doctor blades or calendar rolls). The common factor in these methods is that the composition is heated to a temperature sufficient to induce flow before application. Upon cooling to ambient conditions, the compositions of the present invention are tacky, non-slump PSAs which may be used to bond components or substrates to one another. Alternatively, the bonding can take place while the adhesive is still hot, but the latter will not, of course, support much stress under these conditions.

After the desired components are bonded with the PSA of the invention, the combination is exposed to ambient air so as to cure the PSA to an essentially non-tacky elastomer. "Essentially tack-free" herein indicates that the surface does not exhibit a measurable degree of tack and feels dry or nearly dry to the touch. The time required for completion of this cure process ranges from about a day to more than a month, depending upon the catalyst type, catalyst level, temperature and humidity, inter alia. As a result of this cure, the adhesive strength of the instant compositions is greatly augmented.

The compositions of this invention find utility in many of the same applications as now being served by silicone PSAs and/or organic hot melt adhesives, particularly in such industries as automotive, electronic, construction, space and medical. In these areas of application, the instant PSAs provide bonds which are resistant to hostile environments, such as heat and moisture.

So that those skilled in the art can understand and appreciate the invention taught herein, the following examples are presented, it being understood that these examples should not be used to limit the scope of this invention found in the claims attached hereto. All parts and percentages in the examples are on a weight basis and all measurements were obtained at 25° C., unless indicated to the contrary.

The following components were used in the examples.

RESIN 1 is a 62% solution in xylene of a solid MQ resin having a $M_n$ of approximately 5,000 consisting essentially of trimethylsiloxane units and $SiO_{4/2}$ units in a molar ratio of approximately 1:1 wherein the resin has been capped with trimethylsiloxy groups so as to provide a residual silicon-bonded hydroxyl content of about 0.58 weight percent in solution based on FTIR.

RESIN 2 is a 70% solution in xylene of a siloxane resin copolymer having a $M_n$ of approximately 2,600 consisting essentially of $(CH_3)_3SiO_{1/2}$ units and $SiO_{4/2}$ units in a molar ratio of approximately 1:1 and having a hydroxyl content of approximately 2.6 wt % in solution based on FTIR.

RESIN 3 is a 62.5% solution in xylene of a solid MQ resin consisting essentially of trimethylsiloxane units and $SiO_{4/2}$ units in a molar ratio of about 0.63:1 wherein the resin has been capped with trimethylsiloxy groups so as to provide a residual silicon-bonded hydroxyl content of about 0.21 weight percent in solution based on titration.

RESIN 4 is a 74% solution in xylene of a solid MQ resin consisting essentially of trimethylsiloxy units and $SiO_{4/2}$ units in a molar ratio of about 0.8:1 and having a silicon-bonded hydroxyl content in solution of about 2.6 weight percent as measured by FTIR.

FLUID A is a polydimethylsiloxane fluid having a viscosity of approximately 450 mm$^2$/s terminated with the units of the formula $—CH_2CH_2Si(Me)_2OSi(Me)_2CH_2CH_2Si(OMe)_3$.

FLUID B is a hydroxy-endblocked polydimethylsiloxane fluid having a degree of polymerization of about 880 and a viscosity of about 55,000 mm$^2$/s.

FLUID C is a polydimethylsiloxane fluid having a viscosity of approximately 2,000 mm$^2$/s terminated with the units of the formula $—CH_2CH_2Si(Me)_2OSi(Me)_2CH_2CH_2Si(OMe)_3$.

FLUID D is a dimethyl methylvinylsiloxane fluid having a plasticity of about 60 mils and a vinyl content of about 1.1%.

FLUID E is a polydimethylsiloxane fluid having a viscosity of approximately 65,000 mm$^2$/s terminated with the units of the formula $—CH_2CH_2Si(Me)_2OSi(Me)_2CH_2CH_2Si(OMe)_3$.

HMDZ is hexamethyldisilazane.

TBT is tetra n-butyl titanate.

TDIDE is 2,5-di-isopropoxy-bis(ethylacetate)titanium.

DBTDL is dibutyltindilaurate.

TFAA is trifluoroacetic acid.

Adhesion Promoter is the reaction product of glycidoxypropyltrimethoxysilane and aminopropyltrimethoxysilane.

The trimethylsiloxy/$SiO_{4/2}$ ratio of the resins was determined by $^{29}Si$ nmr and, in this case, the reported results include any neopentamer component present in the resin.

Adhesion Testing

Adhesive strength of PSA compositions was determined as a function of cure time under ambient conditions using a plastic box construction. The box construction comprised four integrally-formed side walls and a detachable, form-fitting bottom plate. The box had a generally rectangular cross-section measuring 3.5 cm wide×6 cm long, had a wall height of 1.5 cm and had a wall thickness of 5 mm. Each side wall had a 3 mm wide recessed step along its bottom interior edge for receiving said bottom plate such that the exterior surface of the latter was flush with said edges when seated on said step.

In a typical adhesion evaluation, the plate was detached and a thin bead of molten PSA was extruded from a heated metal cartridge (approximately 150° C.) along the 3 mm wide step. The bottom plate was pressed into place so as to contact the adhesive on the step and thereby provide a box having an open top. The box additionally had external protrusions in two of its opposite walls which allowed it to be constrained in a special jig while the bottom plate was pushed out with the ram of an arbor press apparatus, the apparatus having been modified to measure the applied force. The force necessary to push the bottom plate out of the wall section was recorded and the test repeated on identical box constructions at various storage times at ambient conditions to asses adhesion and its improvement with cure.

EXAMPLE 1

Approximately 5.95 grams of 1,1,2,4-tetramethyl-1-sila-2-azacyclopentane was combined with 245.9 grams of Resin 1, followed by the addition of 4.78 grams glycidoxypropyltrimethoxysilane to produce an amine-alkoxy resin (Resin AA).

101.5 grams of Resin AA and 40 grams of Fluid A were combined and well blended. The mixture was devolatilized by pulling a vacuum while the pot temperature was ramped upward to a maximum of 130° C. The system was maintained at a pot temperature of 130° C. and a maximum vacuum of <10 mm Hg for about 10 minutes, until visible signs of volatile components coming overhead were no longer observed. 1 gram of TBT was then added to the molten material and the product was recovered for application to a box construction as described above.

EXAMPLE 2

Approximately 5.8 grams of 1,1,2,4-tetramethyl-1-sila-2-azacyclopentane was combined with 250.0 grams of Resin 1, followed by the addition of 9.3 grams glycidoxypropyltrimethoxysilane. The mixture was heated to 60° C. and maintained at that temperature for 4 hours. The resin product was cooled to room temperature to produce an amine-alkoxy resin (Resin BB).

103.3 grams of Resin BB and 40 grams of Fluid A were combined and well blended. The mixture was devolatilized as in Example 1. 1 gram of TBT was then added to the molten material and the product was recovered for application to a box construction as described above.

EXAMPLE 3

103.3 grams of Resin BB produced in Example 2 and 40 grams of Fluid A were combined and well blended. The mixture was devolatilized as in Example 1. The product was recovered for application to a box construction as described above.

EXAMPLE 4

Approximately 23.3 grams of 1,1,2,4-tetramethyl-1-sila-2-azacyclopentane was combined with 1000.0 grams of Resin 1. The mixture was heated for 1 hour at 60° C. Approximately 37.2 grams glycidoxypropyltrimethoxysilane and 100 grams of isopropanol were added to the resin. This mixture was heated to 60° C. and maintained at that temperature for 4 hours. The resin product was cooled to room temperature to produce an amine-alkoxy resin (Resin CC).

80 grams of Fluid B and 6.05 grams of methyltri(ethylmethylketoxime)silane were combined and well blended for 30 minutes at 60° C. 214.4 grams of Resin CC was added to this mixture and blended for 30 minutes at 60° C. The mixture was devolatilized as in Example 1. 2.0 grams of TBT was added to the molten material and the product was recovered for application to a box construction as described above.

EXAMPLE 5

107.2 grams of Resin CC produced in Example 4 and 40 grams of Fluid C were combined and blended for 30 minutes at 60° C. The mixture was devolatilized as in Example 1. 1 gram of TBT was added to the molten material and the product was recovered for application to a box construction as described above.

EXAMPLE 6

107.2 grams of Resin CC produced in Example 4 and 3.8 grams of methylvinyl bis(n-methylacetamido)silane were combined and blended for 30 minutes at 60° C. 40 grams of Fluid A was added to the resin mixture and blended for approximately 15 minutes. The mixture was devolatilized as in Example 1. 1 gram of TBT was added to the molten material and the product was recovered for application to a box construction as described above.

EXAMPLE 7

107.2 grams of Resin CC produced in Example 4 and 40 grams of Fluid A were combined and blended for 30 minutes at 60° C. The mixture was devolatilized as in Example 1. 1 gram of TBT was added to the molten material and the product was recovered for application to a box construction as described above.

EXAMPLE 8

Approximately 24.6 grams of 1,1,2,4-tetramethyl-1-sila-2-azacyclopentane was combined with 487 grams of Resin 1. The mixture was heated for 30 minutes at 60° C. Approximately 100 grams of heptane was added, followed by reflux for an hour to remove water. Glycidoxypropyltrimethoxysilane (amount in Table 1) and 10.0 grams of isopropanol were added to 102.4 gram portions of this amine functional resin. This mixture was heated to 60° C. and maintained at that temperature for 4 hours. The resin product was cooled to room temperature to produce the amine-alkoxy resins (Resins DD-GG).

40 grams of Fluid A was added to each resin DD-GG and the mixture was blended for approximately 15 minutes, until uniform. The mixture was devolatilized as in Example 1. 1.0 gram of TBT was added to the molten material and the product was recovered for application to a box construction as described above.

TABLE 1

| Resin | Amount of Glycidoxypropyltrimethoxysilane | | | |
|---|---|---|---|---|
| | DD | EE | FF | GG |
| Amt. Silane (g) | 1.0 | 2.0 | 4.0 | 8.0 |

COMPARISON EXAMPLE 1

Approximately 24.6 grams of 1,1,2,4-tetramethyl-1-sila-2-azacyclopentane was combined with 487 grams of Resin 1. The mixture was heated for 30 minutes at 60° C. Approximately 100 grams of heptane was added, followed by reflux for an hour to remove water. To a 53.1 gram sample of the resin, 5.2 grams of isopropanol were added to the amine functional resin and this mixture was heated to 60° C. and maintained at that temperature for 4 hours. The resin product was cooled to room temperature to produce an amine functional resin (Resin A').

20.7 grams of Fluid A was added to Resin A' and the mixture was blended for approximately 15 minutes, until uniform. The mixture was devolatilized as in Example 1. 0.5 grams of TBT was added to the molten material and the product was recovered for application to a box construction as described above.

EXAMPLE 9

The adhesive composition produced in Examples 1–8 and Comparative Example 1 were stored in aluminum cartridges and applied to the inside rim of a plastic (PBT) box as described above. The laminate was allowed to cure at room temperature, via a moisture cure mechanism, to its ultimate strength. The strength of the adhesive bond was monitored as a function of cure time at room temperature. After curing at least a month at room temperature, laminated PBT samples were heated in an oven to a targeted elevated temperature (130° C. or 150° C.). Immediately upon removal from the oven, the samples were tested for their adhesive strength. The results for adhesive strengths (Newtons) at room and elevated temperatures are given in Table 2.

TABLE 2

| | FORCE TO DE-LAMINATE (Newtons, N) | | | | | |
|---|---|---|---|---|---|---|
| | 20 min | 1 hr | 1 wk | 1 month | @ 130° C. | @ 150° C. |
| Example 1 | 80.1 | — | 733.9 | 733.9 | 249.1 | 169.0 |
| Example 2 | 97.9 | 827.3 | >890 | >890 | 204.6 | 222.4 |
| Example 3 | 93.4 | 320.3 | 538.2 | 729.5 | 195.7 | 133.4 |
| Example 4 | 89.0 | 520.4 | — | >890 | 444.8 | 409.2 |
| Example 5 | 53.4 | 306.9 | — | 818.4 | 329.2 | 329.2 |
| Example 6 | 115.6 | 484.8 | — | >890 | 427 | 355.8 |
| Example 7 | 106.8 | 507.1 | — | >890 | 342.5 | 311.4 |
| Example 8DD | 53.4 | 320.3 | 685.0 | >890 | 146.8 | 89.0 |
| Example 8EE | 53.4 | 373.6 | >890 | >890 | 186.8 | 111.2 |

TABLE 2-continued

| | FORCE TO DE-LAMINATE (Newtons, N) | | | | | |
| --- | --- | --- | --- | --- | --- | --- |
| | 20 min | 1 hr | 1 wk | 1 month | @ 130° C. | @ 150° C. |
| Example 8FF | 75.6 | 511.5 | >890 | 831.8 | 222.4 | 133.4 |
| Example 8GG | 44.5 | 409.2 | >890 | >890 | 453.7 | 444.8 |
| Comparative Example 1 | 48.9 | 266.9 | 600.5 | 738.4 | 80.1 | 57.8 |

EXAMPLE 10

Under a $N_2$ sweep, approximately 4.5 grams of 1,1,2,4-tetramethyl-1-sila-2-azacyclopentane was added drop-wise to 400 grams of Resin 2. The mixture was allowed to blend for 10 minutes following the addition. Approximately 46.6 grams of HMDZ was then added to the reaction flask and permitted to blend, to form a uniform solution. The $N_2$ sweep through the system was then temporarily halted, followed by the addition of 0.8 grams of TFAA to the reactor. The system was then heated and held at 100° C. for one hour. The system was then cooled, followed by the addition of 160 grams of isopropanol and 7.1 grams of glycidoxypropyltrimethoxysilane. The system was reacted for 4 hours at 60° C. Finally the mixture was stripped removing 159 grams of volatiles. The remaining resin product was recovered for future use (Resin HH).

Pressure sensitive adhesive compositions (10-1, 10-2 and 10-3) were produced by combining Resin HH and fluid shown in Table 3. A 10% solution of benzoyl peroxide was used to catalyze the mixture. A portion of each formulation was cast onto a 2 mil Mylar substrate at a wet film thickness of 3 mils, followed by cure for 1 minute at 70° C. and 4 minutes at 178° C. The resultant Mylar-backed adhesive film was then evaluated for 180 Peel adhesion on a Keil Tester, probe tack using a stainless steel probe and lastly for its failure mode when peeled from a stainless steel panel. Formulations and test results are recorded in Table 3.

TABLE 3

| | Example | | |
| --- | --- | --- | --- |
| | 10-1 | 10-2 | 10-3 |
| Resin HH (g) | 9.7 | 10.0 | 10.2 |
| Fluid D (g) | 12.8 | 12.0 | 11.2 |
| 10% Benzoyl Peroxide Solution (g) | 2.0 | 2.0 | 2.0 |
| Peel Adhesion (N/m) | 166.4 | 516.6 | 761.8 |
| Probe Tack (g) | 1006 | 1256 | 1543 |
| Failure Mode on SS | adhesive | adhesive | adhesive |

EXAMPLE 11

Approximately 221.9 grams of Resin 3 was combined with 48.02 grams of an 8.9% solution of 1,1,2,4-tetramethyl-1-sila-2-azacyclopentane in xylene. The mixture was heated to 60° C. and held there for approximately 30 minutes followed by addition of 4.6 grams of glycidoxypropyltrimethoxysilane and 26.3 grams of absolute ethanol (200 proof). The mixture was then heated to 80° C. and allowed to react for about 4 hours. After this step had been completed, approximately 92.3 grams of Fluid E was added to and thoroughly dispersed with the reactor contents. The mixture was then devolatilized using vacuum and heat. Once the maximum temperature and vacuum conditions were attained (145° C. and 86 mm Hg), the system was maintained under these conditions for an additional half hour. The system was then restored to atmospheric pressure using $N_2$.

While still molten and fluid, 3.5 grams of a 67% solution of TBT in Adhesion Promoter was added and dispersed in the mixture. The molten product was then recovered and allowed to cool to room temperature.

The adhesive was applied and evaluated as described in previous examples. The force required to delaminate each bonded part was monitored as a function of time and are listed below.

| Initial strength | 106.8 Newtons (N) |
| --- | --- |
| 1 day | 329.2 N |
| 2 day | 418.1 N |
| 7 day | 645 N |

EXAMPLE 12

Approximately 251.2 grams of Resin 3 was combined with 56.0 grams of an 11.3% solution of 1,1,2,4-tetramethyl-1-sila-2-azacyclopentane in xylene. The mixture was heated to 60° C. and held there for approximately 30 minutes followed by addition of 6.8 grams of glycidoxypropyltrimethoxysilane and 29.8 grams of absolute ethanol (200 proof). The mixture was then heated to 80° C. and allowed to react for about 5.5 hours. After this step had been completed, approximately 92.3 grams of Fluid E was added to and thoroughly dispersed with the reactor contents. The mixture was then devolatilized using vacuum and heat. Once the maximum temperature and vacuum conditions were attained (148° C. and 98 mm Hg), the system was maintained under these conditions for an additional half hour. The system was then restored to atmospheric pressure using $N_2$.

While still molten and fluid, 3.8 grams of a 67% solution of TBT in Adhesion Promoter was added and dispersed in the mixture. The molten product was then recovered and allowed to cool to room temperature.

The adhesive was applied and evaluated as described in previous examples. The force required to delaminate each bonded part was monitored as a function of time and are listed below.

| Initial strength | 93.5 Newtons (N) |
| --- | --- |
| 4 day | 471.5 N |

EXAMPLE 13

Approximately 11.1 grams of 1,1,2,4-tetramethyl-1-sila-2-azacyclopentane and 393 grams of hexane were combined with 1000 grams of Resin 4. The mixture was thoroughly blended and heated to reflux to remove water of condensation. The resin solution was then cooled to ambient temperature and recovered. To approximately 689.4 grams of this resin solution was added 102.2 grams of methyltrimethoxysilane and 4.9 grams TBT. The mixture was heated to and maintained at 71° C. for about an hour, followed by addition of 8.71 grams glycidoxypropyltrimethoxysilane and 69 grams of iso-propanol. The system was maintained at 65°–70° C. for about 4 hours, at which time heat to the system was shut off, the system cooled, and the product recovered. (Resin II)

Approximately 327 grams of Resin II was combined with 96 grams of the Fluid E followed by addition of 0.03 grams Uvitex® OB (Ciba Geigy, Hawthorne, N.Y.), and 5 grams of a 20% carbon black dispersion in Fluid E. The mixture was then heated and blended for about 30 minutes at 60° C. and then devolatilized using heat (up to about 140° C.) and vacuum (approx. 66 mm Hg). Pressure was then restored to the system, and 3.75 grams of a pre-mix of 1 part Adhesion Promoter and 2 parts TBT was dispersed into the molten product.

The resultant molten product was recovered, while still molten and flowable, into an aluminum cartridge and stored in a cool dry location for dispensing at a later date. The adhesive was applied and evaluated as described in previous examples. The force required to delaminate each bonded part was monitored as a function of time and these values are recorded below.

| Initial strength | 44.5 Newtons (N) |
|---|---|
| 2 day | 453.7 N |
| 8 day | 831.8 N |

EXAMPLE 14

Approximately 1000 grams of Resin 3 was combined with 29.24 grams of 1,1,2,4-tetramethyl-1-sila-2-azacyclopentane. The mixture was heated to 60° C. and held there for approximately 45 minutes followed by addition of 31.3 grams glycidoxypropyltrimethoxysilane and 200.3 grams iso-propanol. The mixture was then heated to 80° C. and allowed to react for about 6.5 hours. (Resin JJ)

Approximately 70.8 grams of Fluid E, 4 grams of a 20% carbon black dispersion in Fluid E, and 0.02 grams Uvitex(R) OB were combined with 254 grams of Resin JJ solution. The mixture was then devolatilized using vacuum and heat. Once the maximum temperature and vacuum conditions were attained (145° C. and 18 mm Hg), the system was maintained under these conditions for an additional half hour. The system was then restored to atmospheric pressure using $N_2$.

While still molten and fluid, 3.0 grams of a pre-mix of 1 part Adhesion Promoter and 2 parts TBT was added and dispersed in the mixture. The molten product was then recovered and allowed to cool to room temperature.

The adhesive was applied and evaluated as described in previous examples. The force required to delaminate each bonded part was monitored as a function of time and are listed below.

| Initial strength | 82.3 Newtons (N) |
|---|---|
| 3 day | 671.6 N |
| 7 day | 862.9 N |
| 20 day | >890 N |

EXAMPLE 15

Approximately 150 grams Resin 1, 7.6 grams 1,1,2,4-tetramethyl-1-sila-2-azacyclopentane, and 0.08 grams DBTDL were combined and allowed to react at 60° C. for 30 minutes. Approximately 12.3 grams glycidoxypropyltrimethoxysilane and 50 grams iso-propanol were then added, and the system was allowed to react for an additional 4 hours at 60° C. Approximately 54.2 grams of the Fluid E was thoroughly blended into the system followed by de-volatilization of the product mixture using the procedure described in previous examples. Approximately 2 grams of a pre-mix of 1 part Adhesion Promoter and 2 parts TBT were dispersed in the molten product, followed by recovery and evaluation at a later date.

The resultant molten product was recovered, while still molten and flowable, into an aluminum cartridge and stored in a cool dry location for dispensing at a later date. The adhesive was applied and evaluated as described in previous examples. The force required to delaminate each bonded part was monitored as a function of time and these values are recorded below.

| Initial strength | 26.7 Newtons (N) |
|---|---|
| 23 day | >890 N |

EXAMPLE 16

Approximately 63.2 grams methyltrimethoxysilane, 98 grams heptane, 4.6 grams 1,1,2,4-tetramethyl-1-sila-2-azacyclopentane, and 2.03 grams TBT were added to a reaction flask containing 200.1 grams Resin 4. The mixture was heated to approximately 80° C. and reacted for approximately 1 hr at 80° C. Approximately 20.07 grams of volatiles, which had been collected in a Dean Stark trap, were removed from system. Approximately 4.7 grams glycidoxypropyltrimethoxysilane and 21.6 grams iso-propanol were added to the mixture and allowed to react for about 5.5 hours at 80° C. The resultant resin solution was then cooled to room temperature and recovered. (Resin KK)

The following day, approximately 99.6 grams of Fluid E was thoroughly dispersed into Resin KK. The mixture was then de-volatilized according to the procedure previously described. Once de-volatilized, approximately 3.8 grams of a pre-mix of 1 part Adhesion Promoter and 2 parts TBT was dispersed in the molten product.

The resultant molten product was recovered, while still molten and flowable, into an aluminum cartridge and stored in a cool dry location for dispensing at a later date. The adhesive was applied and evaluated as described in previous examples. The force required to delaminate each bonded part was monitored as a function of time and these values are recorded below.

| Initial strength | 53.4 Newtons (N) |
|---|---|
| 1 day | 627 N |
| 1 week | >890 N |

EXAMPLE 17

Approximately 200 grams of Resin 3 was combined with 6.4 grams of 3-aminopropyltrimethoxysilane, heated to approximately 80° C., and allowed to react for about 1 hour. Approximately 5.4 grams glycidoxypropyltrimethoxysilane and 23.9 grams isopropanol were then added to the reaction mixture and allowed to further react for approximately 4.5 hrs at 80° C.

Approximately 72.3 grams of Fluid D was then thoroughly blended with the above-described resin solution, and devolatilized, and mixed with 3.0 grams of a pre-mix of 1 part Adhesion Promoter and 2 parts TBT and recovered into an aluminum cartridge per the typical procedures described in previous examples.

The recovered adhesive was also evaluated for short term adhesive strength using a method which has also been previously described. Test results are given below.

| Initial strength | 133.4 Newtons (N) |
|---|---|
| 1 day | 564.9 N |
| 1 week | >890 N |

What is claimed is:

1. A moisture-curable silicone composition comprising
    (A) an organopolysiloxane resin comprising $R_3SiO_{1/2}$ siloxane units bonded to the $SiO_{4/2}$ siloxane units wherein R is selected from the group consisting of hydrocarbon radicals and halogenated hydrocarbon radicals; and curing radicals of the formula —$SiY_2ZNY'ZSiR^1{}_xY''{}_{3-x}$ wherein $R^1$ is a monovalent hydrocarbon radical; each Z is a divalent linking group; each Y is independently selected from the group consisting of a monovalent organic radical, an enoloxy radical, an alkoxy radical, and an oximo radical; Y' is selected from the group consisting of a monovalent organic radical, a hydrogen atom, and —$ZSiR^1{}_xY''{}_{3-x}$; Y" is selected from the group consisting of an enoloxy radical, an alkoxy radical, and an oximo radical; and subscript x has a value of 0 or 1; and
    (B) a diorganopolysiloxane polymer, each terminal group thereof containing at least one silicon-bonded hydrolyzable functional radicals selected from the group consisting of alkoxy radicals having 1 to 4 carbon atoms, ketoxime radicals, enoloxy radicals, aminoxy radicals, acetamido radicals, N-methylacetamido radicals and acetoxy radicals; said polymer having a viscosity at 25° C. of 20 to <100,000 mm²/s the weight ratio of said resin to said polymer being in the range 5:95 to 90:10.

2. A moisture-curable silicone composition as claimed in claim 1 wherein the organopolysiloxane resin contains curing radicals of the formula

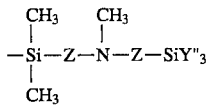

wherein each Z is a divalent linking group; and Y" is selected from the group consisting of an enoloxy radical, an alkoxy radical, and an oximo radical.

3. A moisture-curable silicone composition as claimed in claim 2 wherein the organopolysiloxane resin contains curing radicals of the formula

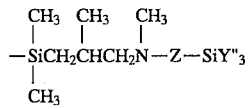

wherein each Z is a divalent linking group; and Y" is selected from the group consisting of an enoloxy radical, an alkoxy radical, and an oximo radical.

4. The composition as claimed in claim 3 wherein the curing radicals of the organopolysiloxane resin (A) are of the formula

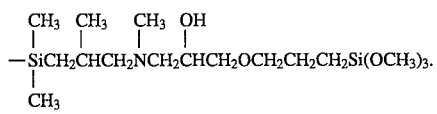

5. A moisture-curable silicone composition as claimed in claim 1 wherein the organopolysiloxane resin contains curing radicals of the formula

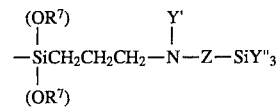

wherein Z is a divalent linking group; Y' is selected from the group consisting of a monovalent organic radical, a hydrogen atom, and —$ZSiR^1{}_xY''{}_{3-x}$ where $R^1$ is a monovalent hydrocarbon radical; Y" is selected from the group consisting of an enoloxy radical, an alkoxy radical, and an oximo radical; and $R^7$ is selected from the group consisting of an alkyl radical and an alkoxyalkyl radical.

6. A moisture-curable silicone composition as claimed in claim 5 wherein the organopolysiloxane resin contains curing radicals of the formula

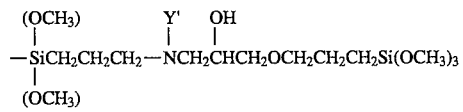

wherein Y' is selected from the group consisting of a monovalent organic radical a hydrogen atom, and —$ZSiR^1{}_xY''{}_{3-x}$ where $R^1$ is a monovalent hydrocarbon radical and Z is a divalent linking group.

7. A moisture-curable silicone composition as claimed in claim 1 where the organopolysiloxane resin contains curing radicals of the formula

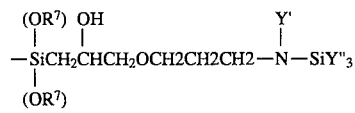

wherein Z is a divalent linking group; Y' is selected from the group consisting of a monovalent organic radical, a hydrogen atom, and —$ZSiR^1{}_xY''{}_{3-x}$ where $R^1$ is a monovalent hydrocarbon radical; Y" is selected from the group consisting of an enoloxy radical, an alkoxy radical, and an oximo radical; and $R^7$ is selected from the group consisting of an alkyl radical and an alkoxyalkyl radical.

8. A moisture-curable silicone composition as claimed in claim 7 where the organopolysiloxane resin contains curing radicals of the formula

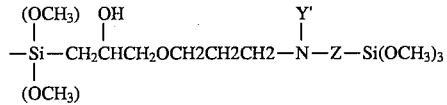

wherein Z is a divalent linking group; and Y' is selected from the group consisting of a monovalent organic radical, a hydrogen atom and —$ZSiR^1{}_xY''{}_{3-x}$ where $R^1$ is a monovalent hydrocarbon radical.

9. The composition as claimed in claim 1, wherein the viscosity of polydiorganosiloxane (B) is 350 to 60,000 mm²/s at 25° C.

10. The composition as claimed in claim 1, wherein the terminal groups of polydiorganosiloxane (B) are selected from alkoxy groups having the formula —$ZSiR^1_x(OR^7)_{3-x}$ wherein $R^1$ is a monovalent hydrocarbon radical; $R^7$ is selected from the group consisting of a alkyl radical and alkoxyalkyl radical; Z is a divalent linking radical; and subscript x has a value of 0 or 1.

11. The composition as claimed in claim 10, wherein the terminal groups of polydiorganosiloxane (B) are selected from the group consisting of the structures $(MeO)_3SiO$—, $Me(MeO)_2SiO$—, $(MeO)_3SiCH_2CH_2SiMe_2O$— and $(MeO)_3SiCH_2CH_2Si(Me)_2OSi(Me)_2CH_2CH_2$—, in which Me denotes a methyl radical.

12. The composition as claimed in claim 11 wherein each diorganopolysiloxane (B) contains at least two silicon-bonded hydrolyzable groups of the formula $(MeO)_3SiCH_2CH_2Si(Me_2)OSi(Me_2)CH_2CH_2$—.

13. A composition as claimed in claim 1 wherein the weight ratio of said resin to said polymer is in the range of 40:60 to 70:30.

14. A composition as claimed in claim 13 wherein the weight ratio of said resin to said polymer is in the range of 55:45 to 65:35.

15. A composition as claimed in claim 1 wherein there is additionally sufficient catalyst to accelerate the cure of said composition.

16. The composition as claimed in claim 15 wherein the catalyst (C) is tetra n-butyl titanate.

17. A composition as claimed in claim 1 wherein there is additionally at least one silane (D) of the formula $R^2_{4-y}SiX_y$ or oligomeric reaction products thereof, in which $R^2$ is selected from the group consisting of hydrocarbon radicals having 1 to 6 carbon atoms, glycidoxyalkyl radicals, aminoalkyl radicals and aminoalkylaminoalkyl radicals; X is a hydrolyzable group; and subscript y has a value of 2 to 4.

18. The composition as claimed in claim 17, wherein the amount of said silane (D) is present in an amount of 0.01 to 10 weight percent, based on the weight of (A) and (B).

19. The composition as claimed in claim 17, wherein the amount of said silane (D) is present in an amount of 0.3 to 5 weight percent, based on the weight of (A) and (B).

20. The composition as claimed in claim 17 wherein X is selected from the group consisting of alkoxy radicals having 1 to 4 carbon atoms, ketoxime radicals, enoloxy radicals, aminoxy radicals, acetamido radicals, N-methylacetamido radicals and acetoxy radicals.

21. The composition as claimed in claim 20, wherein X is an alkoxy radical having 1 to 4 carbon atoms.

22. The composition as claimed in claim 21, wherein the silane (D) is selected from the group consisting of methyltrimethoxysilane, methyltriethoxysilane, propyltrimethoxysilane, tetramethoxysilane, tetraethoxysilane, phenyltrimethoxysilane, glycidoxypropyltrimethoxysilane, ethyltrimethoxysilane, aminopropyltrimethoxysilane, aminoethylaminopropyltrimethoxysilane and isobutyltrimethoxysilane.

23. The composition as claimed in claim 20, wherein X is a ketoxime radical having the formula —$ON=C(R^3)_2$ wherein each $R^3$ is independently an alkyl group having 1 to 6 carbon atoms or a phenyl group.

24. The composition as claimed in claim 23, wherein the silane (D) is selected from the group consisting of tetra(m-ethylethylketoximo)silane, methyltris(methylethylketoximo)silane and vinyltris(methylethylketoximo) silane.

25. The composition as claimed in claim 20 wherein X is an acetoxy radical.

26. The composition as claimed in claim 25 wherein the silane (D) is selected from the group consisting of methyltriacetoxysilane, and ethyltriacetoxysilane.

27. The composition as claimed in claim 20 wherein X is an acetamido radical.

28. The composition as claimed in claim 27 wherein silane (D) methylvinyl bis(n-methylacetamido)silane.

29. A moisture-curable silicone hot melt pressure-sensitive adhesive composition comprising (A) an organopolysiloxane resin comprising $R_3SiO_{1/2}$ siloxane units bonded to the $SiO_{4/2}$ siloxane units wherein R is selected from the group consisting of hydrocarbon radicals and halogenated hydrocarbon radicals: and curing radicals of the formula —$SiY_2ZNY'ZSiR^1_xY''_{3-x}$ wherein $R^1$ is a monovalent hydrocarbon radical; each Z is a divalent linking group; each Y is independently selected from the group consisting of a monovalent organic radical, an enoloxy radical, an alkoxy radical, and an oximo radical; Y' is selected from the group consisting of a monovalent organic radical, a hydrogen atom, and —$ZSiR^1_xY''_{3-x}$; Y" is selected from the group consisting of an enoloxy radical, an alkoxy radical, and an oximo radical; and subscript x has a value of 0 or 1; and (B) a diorganopolysiloxane polymer, each terminal group thereof containing at least one silicon-bonded hydrolyzable functional radicals selected from the group consisting of alkoxy radicals having 1 to 4 carbon atoms, ketoxime radicals, enoloxy radicals, aminoxy radicals, acetamido radicals, N-methylacetamido radicals and acetoxy radicals; said polymer having a viscosity at 25° C. of 20 to <100,000 $mm^2/s$ and the weight ratio of said resin to said polymer being in the range 55:45 to 70:30;

said composition being essentially solvent-free non-slump solid at room temperature which cures to an elastomer upon exposure to moisture.

30. An organopolysiloxane resin comprising curing radicals of the formula (A) an organopolysiloxane resin comprising $R_3SiO_{1/2}$ siloxane units bonded to the $SiO_{4/2}$ siloxane units wherein R is selected from the group consisting of hydrocarbon radicals and halogenated hydrocarbon radicals; and curing radicals of the formula —$SiY_2ZNY'ZSiR^1_xY''_{3-x}$ wherein $R^1$ is a monovalent hydrocarbon radical; each Z is a divalent linking group; each Y is independently selected from the group consisting of a monovalent organic radical, an enoloxy radical, an alkoxy radical, and an oximo radical; Y' is selected from the group consisting of a monovalent organic radical, a hydrogen atom, and —$ZSiR^1_xY''_{3-x}$; Y" is selected from the group consisting of an enoloxy radical, an alkoxy radical, and an oximo radical; and the subscript x has a value of 0 or 1.

31. A moisture-curable silicone composition as claimed in claim 29 wherein the organopolysiloxane resin contains curing radicals of the formula

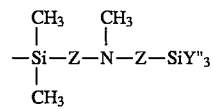

wherein each Z is a divalent linking group; and Y" is selected from the group consisting of an enoloxy radical, an alkoxy radical, and an oximo radical.

32. A moisture-curable silicone composition as claimed in claim 31 wherein the organopolysiloxane resin contains curing radicals of the formula

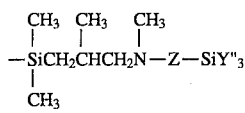

wherein each Z is a divalent linking group; and Y" is selected from the group consisting of an enoloxy radical, an alkoxy radical, and an oximo radical.

33. The composition as claimed in claim 32 wherein the curing radicals of the organopolysiloxane resin (A) are of the formula

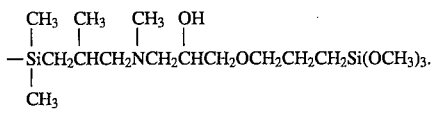

34. A moisture-curable silicone composition as claimed in claim 29 wherein the organopolysiloxane resin contains curing radicals of the formula

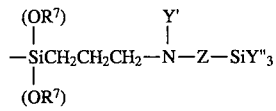

wherein Z is a divalent linking group; Y' is selected from the group consisting of a monovalent organic radical, a hydrogen atom and —$ZSiR^1_xY''_{3-x}$ where $R^1$ is a monovalent hydrocarbon radical; Y" is selected from the group consisting of an enoloxy radical, an alkoxy radical, and an oximo radical; and $R^7$ is selected from the group consisting of an alkyl radical and an alkoxyalkyl radical.

35. A moisture-curable silicone composition as claimed in claim 34 wherein the organopolysiloxane resin contains curing radicals of the formula

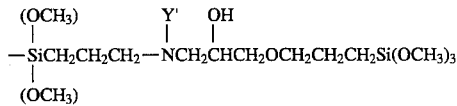

wherein Y' is selected from the group consisting of a monovalent organic radical, a hydrogen atom, and —$ZSiR^1_xY''_{3-x}$ where $R^1$ is a monovalent hydrocarbon radical and Z is a divalent linking group.

36. A moisture-curable silicone composition as claimed in claim 29 where the organopolysiloxane resin contains curing radicals of the formula

wherein Z is a divalent linking group; Y' is selected from the group consisting of a monovalent organic radical, a hydrogen atom and —$ZSiR^1_xY''_{3-x}$ where $R^1$ is a monovalent hydrocarbon radical; Y" is selected from the group consisting of an enoloxy radical, an alkoxy radical, and an oximo radical; and $R^7$ is selected from the group consisting of an alkyl radical and an alkoxyalkyl radical.

37. A moisture-curable silicone composition as claimed in claim 36 where the organopolysiloxane resin contains curing radicals of the formula

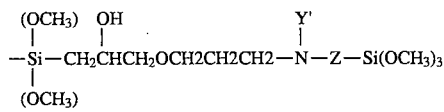

wherein Z is a divalent linking group; and Y' is selected from the group consisting of a monovalent organic radical, a hydrogen atom, and —$ZSiR^1_xY''_{3-x}$ where $R^1$ is a monovalent hydrocarbon radical.

38. A method for producing moisture curing pressure sensitive adhesive compositions wherein said method comprises (I) reacting an amine functional resin comprising $R_3SiO_{1/2}$ siloxane units, $SiO_{4/2}$ siloxane units and $O_{3/2}SiOSiY_2ZNHY'''$ siloxane units; wherein the mole ratio of the $R_3SiO_{1/2}$ siloxane units to $SiO_{4/2}$ has a value of from 0.5/1 to 1.2/1; with (ii) an epoxy compound having the formula $Z'SiR^1_xY''_{3-x}$;

wherein R is selected from the group consisting of hydrocarbon radicals and halogenated hydrocarbon radicals, wherein $R^1$ is a monovalent hydrocarbon radical; each Z is a divalent linking groups; each Y is independently selected from the group consisting of a monovalent organic radical, an enoloxy radical, an alkoxy radical, and an oximo radical; Y' is selected from the group consisting of a monovalent organic radical, a hydrogen atom, and —$ZSiR^1_xY''_{3-x}$; Y" is selected from the group consisting of an enoloxy radical, an alkoxy radical, and an oximo radical; Y''' is selected from the group consisting of a monovalent organic group and a hydrogen atom; Z' is an organic group composed of carbon, hydrogen and oxygen having therein at least one oxirane group and the subscript x has a value of 0 or 1;

(II) combining the reaction product of (I) with a diorganopolysiloxane polymer, each terminal group thereof containing at least one silicon-bonded hydrolyzable functional radicals selected from the group consisting of alkoxy radicals having 1 to 4 carbon atoms, ketoxime radicals, enoloxy radicals, aminoxy radicals, acetamido radicals, N-methylacetamido radicals and acetoxy radicals;

the weight ratio of the reaction product of (I) to the diorganopolysiloxane polymer being in the range of 5:95 to 90:10.

39. The method as claimed in claim 38 wherein the weight ratio of the reaction product of (I) to the diorganopolysiloxane polymer is in the range of 55:45 to 70:30.

* * * * *